United States Patent
Yoshida et al.

(10) Patent No.: US 10,601,039 B2
(45) Date of Patent: Mar. 24, 2020

(54) SODIUM LAYERED OXIDE AS CATHODE MATERIAL FOR SODIUM ION BATTERY

(71) Applicants: TOYOTA MOTOR EUROPE, Brussels (BE); CENTRE NATIONAL DE LA RECHERCHE SCIENTIFIQUE, Paris (FR)

(72) Inventors: Jun Yoshida, Bordeaux (FR); Claude Delmas, Pessac (FR); Marie Guignard, Pessac (FR); Dany Carlier-Larregaray, Pessac (FR)

(73) Assignees: TOYOTA MOTOR EUROPE, Brussels (BE); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 144 days.

(21) Appl. No.: 15/742,847

(22) PCT Filed: Jul. 15, 2015

(86) PCT No.: PCT/IB2015/001766
§ 371 (c)(1),
(2) Date: Jan. 8, 2018

(87) PCT Pub. No.: WO2017/009681
PCT Pub. Date: Jan. 19, 2017

(65) Prior Publication Data
US 2018/0205081 A1   Jul. 19, 2018

(51) Int. Cl.
*H01M 4/525* (2010.01)
*H01M 4/505* (2010.01)
(Continued)

(52) U.S. Cl.
CPC ............ *H01M 4/525* (2013.01); *C01G 53/50* (2013.01); *H01M 4/505* (2013.01); *H01M 10/05* (2013.01);
(Continued)

(58) Field of Classification Search
CPC .... H01M 4/505; H01M 4/525; H01M 10/054; C01G 53/00
See application file for complete search history.

(56) References Cited

U.S. PATENT DOCUMENTS

| 2008/0118829 A1 | 5/2008 | Nanno |
| 2012/0183837 A1 | 7/2012 | Johnson et al. |
| 2014/0349177 A1 | 11/2014 | Chung et al. |

FOREIGN PATENT DOCUMENTS

| EP | 2 139 058 A1 | 12/2009 |
| JP | 2002-220231 A | 8/2002 |

(Continued)

OTHER PUBLICATIONS

Machine Translation of: JP 2010-129509 A, Katsuisa et al., Jun. 10, 2010.*

(Continued)

*Primary Examiner* — Kenneth J Douyette
(74) *Attorney, Agent, or Firm* — Oliff PLC

(57) ABSTRACT

A mixed oxide of sodium and transition metals having the formula (1):

$$Na_x[Mn_aNi_bCo_c]O_{2+y} \quad (1)$$

wherein: $0.5 \leq x \leq 0.9$, $-0.1 \leq y \leq 0.1$, $a+b+c=1$, $4a+2b+3c=4-x+2y$, and $0<c\leq 0.5$. Further a process for producing such a mixed oxide, a positive electrode including such a mixed oxide and a sodium ion secondary battery including such a positive electrode.

15 Claims, 6 Drawing Sheets

(51) Int. Cl.
*H01M 10/054* (2010.01)
*C01G 53/00* (2006.01)
*H01M 10/05* (2010.01)
H01M 4/1391 (2010.01)
H01M 4/04 (2006.01)
H01M 4/02 (2006.01)

(52) U.S. Cl.
CPC ....... *H01M 10/054* (2013.01); *C01P 2002/50* (2013.01); *C01P 2002/72* (2013.01); *C01P 2002/77* (2013.01); *C01P 2006/40* (2013.01); *H01M 4/0471* (2013.01); *H01M 4/1391* (2013.01); *H01M 2004/028* (2013.01); *H01M 2220/20* (2013.01)

(56) References Cited

FOREIGN PATENT DOCUMENTS

| | | |
|---|---|---|
| JP | 2010-129509 A | 6/2010 |
| JP | 2012-250895 A | 12/2012 |
| WO | 2014/132174 A1 | 9/2014 |
| WO | 2015/097950 A1 | 7/2015 |

OTHER PUBLICATIONS

Mar. 21, 2016 Search Report issued in International Patent Application No. PCT/IB2015/001766.
Mar. 21, 2016 Written Opinion issued in International Patent Application No. PCT/IB2015/001766.

* cited by examiner

US 10,601,039 B2

SODIUM LAYERED OXIDE AS CATHODE MATERIAL FOR SODIUM ION BATTERY

FIELD OF THE INVENTION

The present invention relates to a mixed oxide of sodium and transition metals, in particular a mixed oxide composition with manganese (Mn), nickel (Ni) and cobalt (Co) as well as sodium (Na). This mixed oxide of sodium and transition metals can be used as a positive electrode active material, in particular as a positive electrode active material in a sodium battery.

TECHNOLOGICAL BACKGROUND TO THE INVENTION

Sodium ion batteries are favourable candidates inter alia for future hybrid and electric vehicles because of the low material price of sodium and high energy density, beyond that available for lithium ion batteries. Sodium layered oxides ($Na_xMO_2$, M: Transition metal) can be used as materials for the positive electrode in view of their high capacity and ion diffusivity, leading to high energy and power batteries.

JP-2002-220231 discloses a layered sodium-cobalt-manganese oxide having a uniform composition and a single crystal for a lithium ion secondary battery. The oxide has the formula $Na_xCo_yMn_{1-y}O_2$ ($0.6 \le x \le 0.8$, $0.4 \le y \le 0.6$). The materials prepared do not include Ni (nickel).

WO 2014/132174 discloses a doped sodium manganese cathode material for a sodium ion battery with the formula $Na_xMO_2$ wherein $M = Mn_{1-y-z}Li_yA_z$, $0.66 \le x \le 0.95$, $y < 0.33$, $z < 0.2$, A=Ti, Fe, Ni, Mg, Co. A number of Na—Li—Mn multi-cation compositions were investigated.

US 2012/0183837 discloses materials suitable for use as a cathode in a sodium electrochemical cell or battery, the electrode comprising a layered material of formula $Na_cLi_dNi_eMn_fM_zO_b$, wherein M comprises one or more metal cations, $0.24 \le c/b \le 0.5$, $0 < d/b \le 0.23$, $0 \le e/b \le 0.45$, $0 \le f/b \le 0.45$, $0 \le z/b \le 0.45$, the combined average oxidation state of the metal components (i.e., $Na_cLi_dNi_eMn_fM_z$) is in the range of about 3.9 to 5.2, and b is equal to (c+d+Ve+Xf+Yz)/2, wherein V is the average oxidation state of the Ni, X is the average oxidation state of the Mn, and Y is the average oxidation state of the M in the material.

JP-2012-250895 discloses a sodium-containing composite metal oxide having a layered crystal structure suitably used as an electrode active substance for a sodium secondary battery. The method for manufacturing an inorganic material includes converting at least a part of a lithium-containing composite metal oxide represented by $Li_aA_bM_cO_d$ to a sodium-containing composite metal oxide having a layered crystal structure by an electrochemical treatment, wherein a is at least one element selected from the group consisting of Na and K; M is at least one transition metal element; $0 < a \le 1.5$, $0 \le b < 1.5$, $0 < c \le 3$, $0 < d \le 6$ and $0 < a + b \le 1.5$.

There is an ongoing need in this field to provide composite metal oxides for sodium batteries which enable excellent and durable electrochemical properties, such as high cyclability.

SUMMARY OF THE INVENTION

The present invention, in one aspect, is directed to a mixed oxide of sodium and transition metals having the formula (1):

$$Na_x[Mn_aNi_bCo_c]O_{2+y} \qquad (1)$$

wherein:
$0.5 \le x \le 0.9$
$-0.1 \le y \le 0.1$
$a+b+c=1$
$4a+2b+3c=4-x+2y$
$0 < c \le 0.5$ In advantageous embodiments, $0.60 \le x \le 0.80$, and more preferably $0.65 \le x \le 0.75$.

In advantageous embodiments, $c > 0.30$, more preferably $c \ge 0.40$, and still more preferably $c \ge 0.45$.

In advantageous embodiments, $a \le 0.55$, and more preferably $a \le 0.45$.

In advantageous embodiments, $b \le 0.25$, and more preferably $b \le 0.15$.

In another aspect, the present invention is related to a process for producing a mixed oxide of sodium and transition metals as defined above, said process comprising the steps of:

(a) preparing an aqueous Solution 1 containing a mixture of soluble salts of Mn, Ni and Co;

(b) preparing an aqueous Solution 2 containing a soluble sodium source;

(c) introducing Solutions 1 and 2 simultaneously into a receiving vessel to induce precipitation, wherein the receiving vessel is preferably provided in advance with water;

(d) recovering the precipitate obtained in step (c), and optionally washing it with distilled water;

(e) drying the precipitate obtained through step (d);

(f) combining, in an inert atmosphere, the dried material obtained through step (e) with a further source of sodium in an amount enabling the required stoichiometry for a final composition according to formula (1) of claim 1 to be reached;

(g) calcining the mixture obtained through step (f) for a temperature of at least 700° C. and at most 1000° C., preferably at least 800° C. and at most 900° C., for a time of at least 1 hour and at most 24 hours, preferably at least 3 hours and at most 12 hours.

DETAILED DESCRIPTION OF THE INVENTION

In the present invention, a mixed oxide of sodium and transition metals has been developed, and in particular a mixed oxide composition with manganese (Mn), nickel (Ni) and cobalt (Co) as well as sodium (Na). Such a composition with three transition metals can advantageously be used as a positive electrode (cathode) active material in a sodium ion battery, and is considered to deliver excellent electrochemical properties in such a situation compared to mixed oxides with only one or two (transition) metals.

Figure 1:
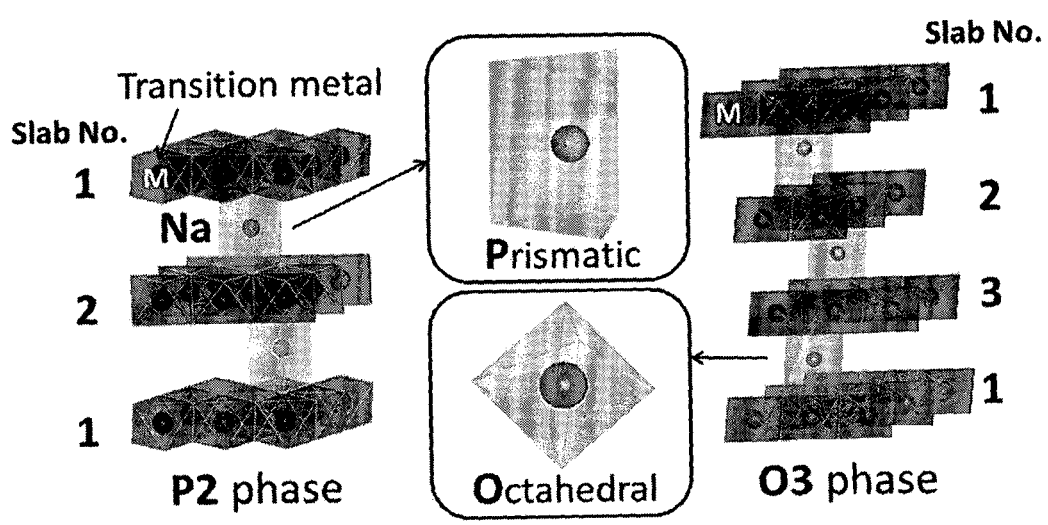
FIG. 1 presents schematic images of crystal structures for P2 and O3 phases for layered $Na_xMO_2$.

The P2 structure is one of the crystal structure types for a layered oxide. Layered $Na_xMO_2$ (M: transition metal) are classified into several groups denoted by "letter" and "number" like "P2" or "O3", shown in FIG. 1. The letter P or O refers to the site environment of sodium with oxygen (P: prismatic or O: octahedric) and the number indicates the number of $MO_2$ slabs within the hexagonal cell. For instance, in the P2 type structure, at the heart of the present invention, sodium ions are in trigonal prismatic sites between two $MO_2$ slabs. The higher ion diffusivity in the trigonal prismatic environment vs. octahedral one is considered to be due to a large diffusion pass for sodium ions. Moreover, oxygen stacking in the P2 phase is very different from the spinel phase which causes battery decay in a high voltage charge process ($Na^+$ deintercalation). The P2 phase never converts to the spinel phase even though a high amount of $Na^+$ intercalates/deintercalates. Base on the high diffusivity and structural stability, P2 type layered oxides are preferred in the present invention.

The P2 structure is sensitive to the sodium amount in the composition. The particular range is $0.5 \leq x \leq 0.9$, preferably $0.6 \leq x \leq 0.8$. If the sodium amount is below or above the limits indicated, the material may convert to unwanted crystal structures such as the O3 phase and/or impurities such as NiO. Therefore, the limitation of sodium amount plays an important role when one wishes to synthesize a P2 structure.

Transition metals in the composition compensate for electron charge during charge and discharge processes. For instance, in the charge process, the electrons are extracted from the positive electrode material and flow to the external circuit. It results an oxidation of the transition metal ions. Therefore, for the charge compensation, sodium ions are extracted from the inter slab space and move through the electrolyte to the negative electrode where sodium metal is formed.

In the synthesis method of mixed oxide materials of the invention, in principle all of the soluble salts of Co, Ni and Mn can be used. Preferably, nitrates, sulfates, chlorides and acetates of Co, Ni and Mn may be used. For the sodium sources, in principle any soluble sodium compound can be used. Preferred Na materials include sodium carbonate, sodium hydroxide, sodium acetate, sodium nitrate. Sodium carbonate is advantageously used in both steps (b) and (f) of the claimed process.

Figure 2:
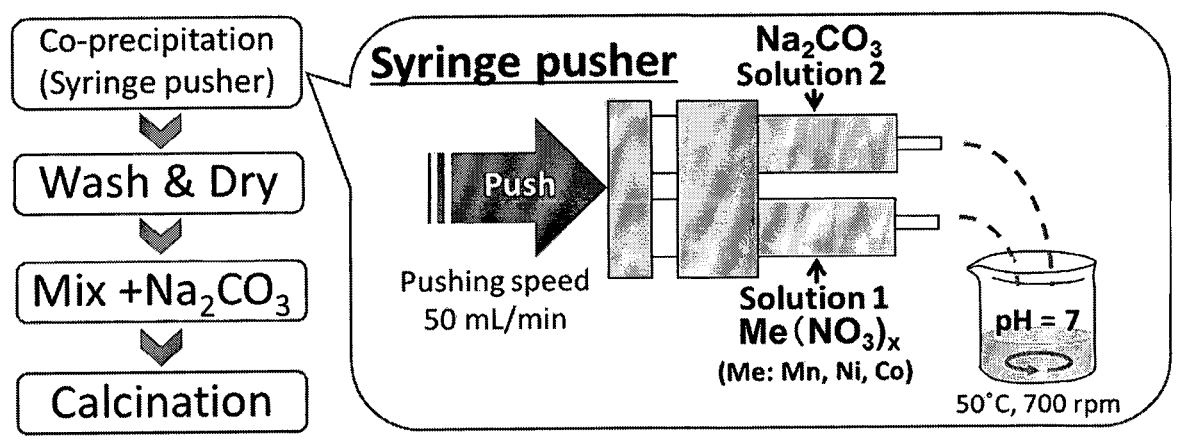
FIG. 2 provides a schematic view of the co-precipitation method in a preferred method of synthesis of mixed oxides of the invention.
Figure 3A:
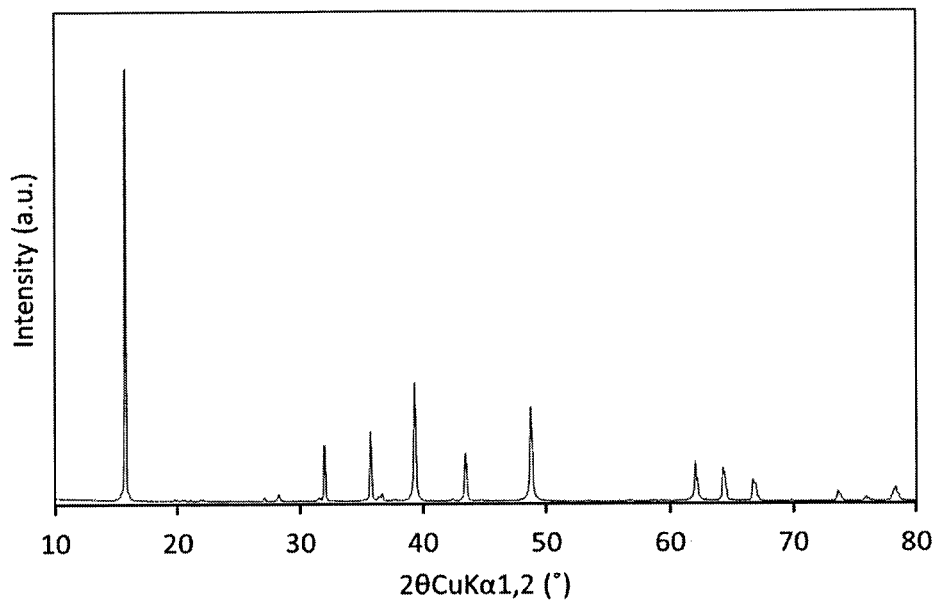
FIGS. 3(a) to 3(e) show X-ray diffraction (XRD) patterns for illustrative exemplary compositions tested experimentally by the present inventors.
Figure 3B:
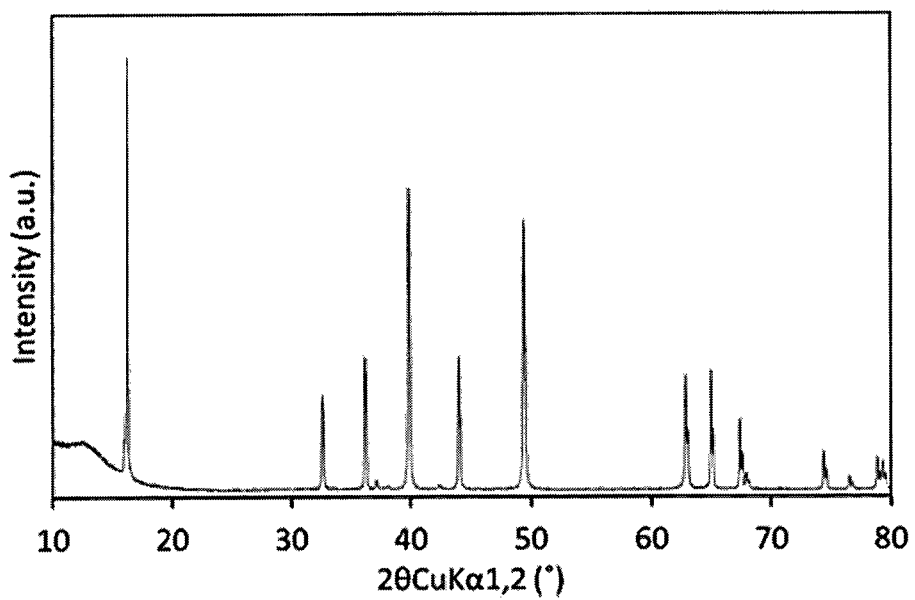
Figure 3C:
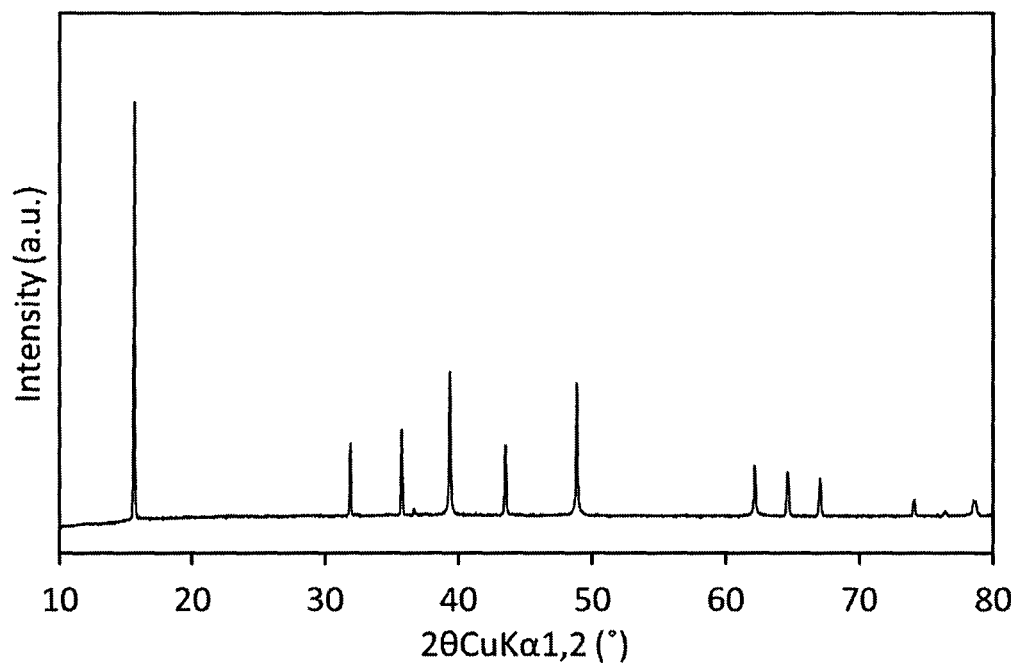
Figure 3D:
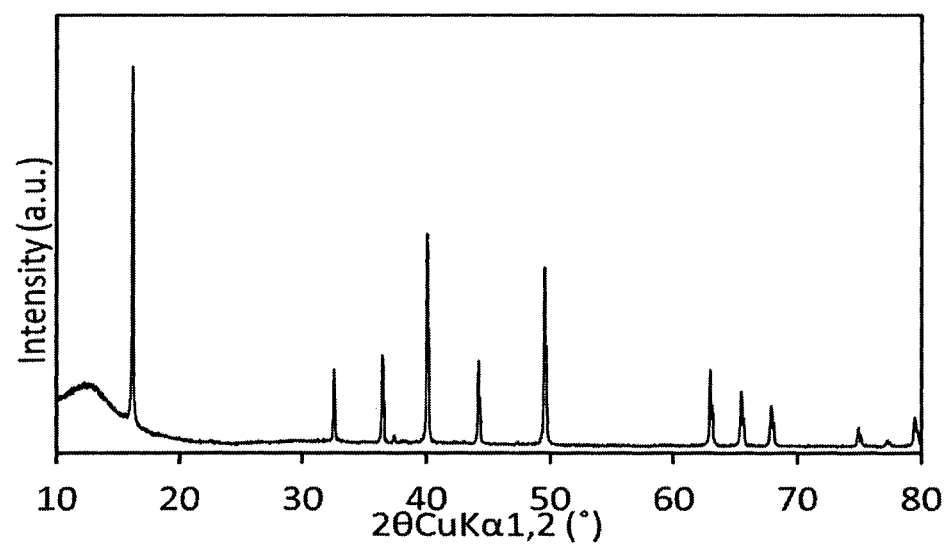
Figure 3E:
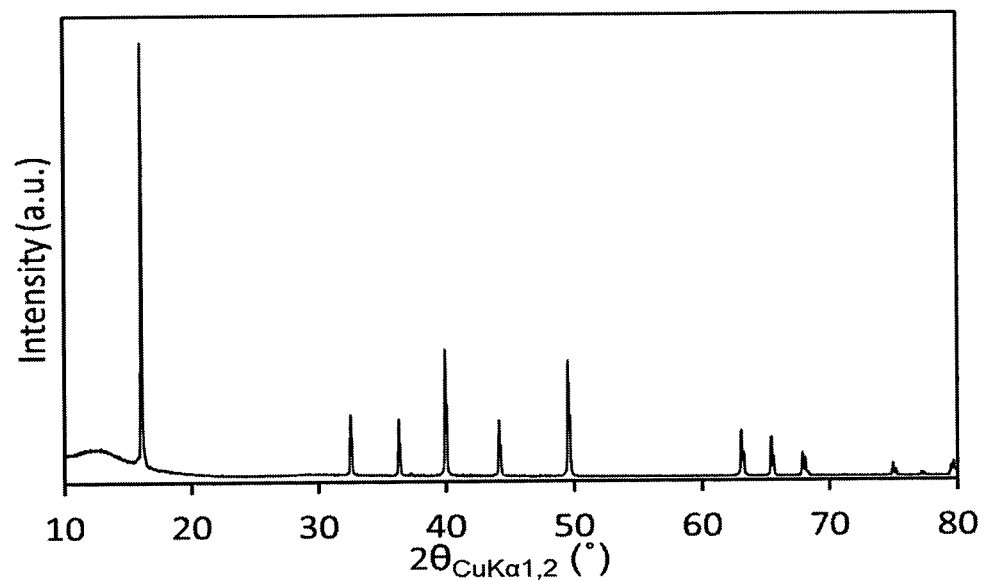

A schematic view of a illustrative and non-limiting example of a synthesis method of mixed oxide materials of the invention is shown in FIG. 2. Two solutions, one made of $Co(NO_3)_2 \cdot 6H_2O$, $Ni(NO_3)_2 \cdot 6H_2O$ and $Mn(NO_3)_2 \cdot 4H_2O$, and another one made of $Na_2CO_3$, were simultaneously dropped into a beaker provided with distilled water (about 500 ml of distilled water, for example, in an illustrative laboratory-scale process). In effect, in this synthesis, it is preferable that water, such as distilled water, be present in advance in the receiving vessel prior to the addition of soluble salts of Co, Ni and Mn on the one hand, and soluble salts of sodium on the other hand. Co-precipitation is preferably carried out using a syringe pusher.

Throughout the co-precipitation, a pH in the region of 7 is maintained without the use of any buffer. An appropriate range of temperature during the reaction is at least 30° C. and at most 80° C., and an appropriate stirring rate is of at least 500 rpm and at most 800 rpm.

The precipitate formed in the co-precipitation step is typically washed with distilled water, for example 5 times, and then dried, for example at 80° C. for two days. The dried powder thus obtained can be mixed with $Na_2CO_3$ in a glove box filled under argon to reach the required stoichiometry for a final $Na_{0.7}[MnNiCo_x]O_2$ composition. The mixture can then be calcined, for example at 900° C. for 12 hours in air. Finally, it may be quenched in air down to room temperature.

The Na—Mn—Ni—Co mixed oxide material provided by this invention can be advantageously used as a positive electrode active material in a sodium battery. The sodium battery may be either a primary battery or a secondary battery. Using a sodium secondary battery by way of illustration, a description is given below of a sodium battery which uses the positive electrode active material provided by this invention.

Figure 4:
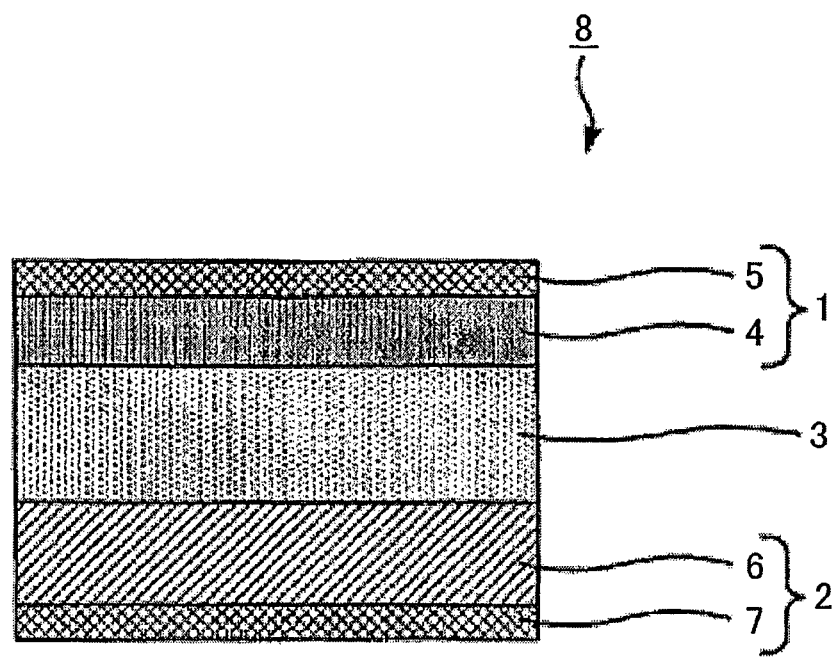
FIG. 4 is a schematic cross-sectional diagram showing an embodiment of a sodium secondary battery.

FIG. 4 is a schematic cross-sectional diagram showing an embodiment of a sodium secondary battery. As shown in FIG. 4, the sodium secondary battery 8 generally has a structure in which an electrolyte layer 3 is disposed between a negative electrode 1 and a positive electrode 2. The negative electrode 1 has a negative electrode active material layer 4 containing a negative electrode active material, and a negative electrode current collector 5 which carries out charge collection for the negative electrode active material layer 4. The positive electrode 2 has a positive electrode active material layer 6 containing a positive electrode active material, and a positive electrode current collector 7 which carries out charge collection for the positive electrode active material layer 6.

In the following paragraphs, each element of battery structure is explained.

The negative electrode contains a negative electrode active material capable of the insertion and extraction of sodium ions. The negative electrode generally has a negative electrode active material layer which includes at least a negative electrode active material. Where necessary, it may also have a negative electrode current collector which carries out charge collection for the negative electrode active material layer.

Illustrative examples of the negative electrode active material include hard carbon, Na metal and tin.

The negative electrode active material layer may contain only a negative electrode active material or may, in addition to the negative electrode active material, contain also a binder, a conductive material, an electrolyte and the like. For example, in cases where the negative electrode active material is in the form of a sheet or foil, it may be rendered into a negative electrode layer which contains only the negative electrode active material. On the other hand, in cases where the negative electrode active material is in the form of a powder, it may be rendered into a negative electrode layer which includes a binder in addition to the negative electrode active material.

Illustrative examples of the binder include polyvinylidene fluoride (PVdF), polytetrafluoroethylene (PTFE) and styrene-butadiene rubber (SBR). Illustrative examples of the conductive material include carbon materials such as carbon black, activated carbon, carbon fibers (e.g., carbon nanotubes, carbon nanofibers), and graphite.

The positive electrode contains a positive electrode active material capable of the insertion and extraction of sodium ions. The positive electrode generally has a positive electrode active material layer which includes at least a positive electrode active material. Where necessary, it may also have a positive electrode current collector which carries out charge collection for the positive electrode active material layer.

The positive electrode active material used may be the above-described positive electrode active material of the invention or may be a positive electrode active material produced by the production method of the invention.

As with the negative electrode active material layer, the positive electrode active material layer may contain only a positive electrode active material or may, in addition to the positive electrode active material, contain also a conductive material, a binder, an electrolyte, an electrode catalyst and the like. Because materials similar to those in the negative electrode active material may be used as the conductive material and binder in the positive electrode active material, descriptions of these are omitted below.

In the case of both the negative electrode active material layer and the positive electrode active material layer, the electrode active material layer may be formed by using any suitable coating method, such as dip coating, spray coating, roll coating, doctor blade coating, gravure coating or screen coating, to coat, dry, and optionally roll, slurries containing the respective materials.

The positive electrode current collector and the negative electrode current collector are not subject to any particular limitations with regard to material, structure or shape, provided they are materials which have the desired electron conductivity and which do not give rise to alloying reactions with sodium ion in the environment within the battery.

Illustrative examples of the material making up the positive electrode current collector include metal materials such as stainless steel, nickel, aluminum, iron, titanium and copper, carbon materials such as carbon fibers and carbon paper, and ceramic materials having a high electron conductivity, such as titanium nitride. It is possible for the battery case to serve also as the positive electrode current collector.

Illustrative examples of the material making up the negative electrode current collector include copper, stainless steel, nickel and aluminum. It is possible for the battery case to serve also as the negative electrode current collector.

The positive electrode current collector and the negative electrode current collector may each be in the form of, for example, a sheet, foil or mesh. Of these, a mesh is preferred.

The electrolyte layer includes at least an electrolyte which enables the conduction of sodium ions between the positive electrode and the negative electrode. An organic electrolyte, a polymer electrolyte or a solid electrolyte may appropriately be used in the batteries using the cathode material of the present invention, based on mixed Na—Mn—Ni—Co oxides.

The electrolyte should be one having sodium ion conductivity and is exemplified by electrolyte solutions, gel-like electrolytes obtained by the gelation of an electrolyte solution with a polymer or the like, and solid electrolytes.

Examples of electrolyte solutions having sodium ion conductivity include electrolyte solutions obtained by dissolving a sodium salt in an aqueous solvent or a nonaqueous solvent.

Illustrative examples of non-aqueous solvent include, but are not particularly limited to, cyclic carbonates such as propylene carbonate (PC), ethylene carbonate (EC) and fluoroethylene carbonate (FEC), cyclic esters such as γ-butyrolactone (GBL), and acyclic carbonates such as dimethyl carbonate (DMC), diethyl carbonate (DEC) and ethyl methyl carbonate (EMC). These non-aqueous solvents may be used singly or two or more may be used in combination. Alternatively, a nitrile compound having a CN group bonded to the end of an acyclic saturated hydrocarbon compound may be used in admixture with a non-aqueous solvent. By adding a nitrile compound to a non-aqueous solvent-type electrolyte solution, there can be obtained a stable non-aqueous solvent-based electrolyte solution which is stable and does not decompose even in a high potential region.

Illustrative examples of the sodium salt include, but are not particularly limited to, $NaPF_6$, $NaBF_4$, $NaClO_4$, $NaCF_3SO_3$, $(CF_3SO_2)_2NNa$, $NaN(FSO_2)$ and $NaC(CF_3SO_2)_3$. These sodium salts may be used singly, or two or more may be used in combination. $NaPF_6$, which is stable also at high potentials, is especially preferred.

No particular limitation is imposed on the concentration of the sodium salt in the non-aqueous electrolyte solution.

The non-aqueous electrolyte solution may also be used following gelation by the addition of a polymer. The method of gelating the non-aqueous electrolyte solution is exemplified by a method that involves adding a polymer such as polyethylene oxide (PEO), polyacrylonitrile (PAN), PVdF or polymethyl methacrylate (PMMA) to a non-aqueous electrolyte solution.

In cases where an electrolyte solution is used as the electrolyte, insulation between the positive electrode and the negative electrode can be achieved by disposing an insulating porous body as a separator between the positive electrode and the negative electrode, and impregnating the separator with the electrolyte solution. The separator is exemplified by porous membranes such as polyethylene porous membranes and polypropylene porous membranes; and nonwoven fabrics such as resin nonwoven fabrics and glass fiber nonwoven fabrics.

The battery case used to house the negative electrode, the electrolyte layer and the positive electrode may be one having a common shape, such as a coin-like, flat plate-like, tubular or laminate-type battery case.

In batteries having a construction in which laminates of a positive electrode, an electrolyte layer and a negative electrode disposed in this order are repeatedly stacked in multiple layers, from the standpoint of safety, separators composed of an insulating material can be provided between the adjoining positive and negative electrodes. Illustrative examples of such separators include porous membranes such as polyethylene porous membranes and polypropylene porous membranes; and nonwoven fabrics such as resin nonwoven fabrics and glass fiber nonwoven fabrics.

In addition, terminals serving as connectors to the exterior can be provided on the current collectors for the respective electrodes.

Within the practice of the present invention, it may be envisaged to combine any features or embodiments which have hereinabove been separately set out and indicated to be advantageous, preferable, appropriate or otherwise generally applicable in the practice of the invention. The present description should be considered to include all such combinations of features or embodiments described herein unless such combinations are said herein to be mutually exclusive or are clearly understood in context to be mutually exclusive.

EXAMPLES

Table 1 below presents compositions obtained by the co-precipitation method described above and represented schematically in FIG. 2.

TABLE 1

| Composition | Phase | Cycle retention |
|---|---|---|
| $Na_{0.7}Mn_{0.7}Ni_{0.3}O_2$ | P2 | 78 |
| $Na_{0.7}Mn_{0.55}Ni_{0.25}Co_{0.2}O_2$ | P2 | 90 |

TABLE 1-continued

| Composition | Phase | Cycle retention |
|---|---|---|
| $Na_{0.7}Mn_{0.5}Ni_{0.2}Co_{0.3}O_2$ | P2 | 90 |
| $Na_{0.7}Mn_{0.45}Ni_{0.15}Co_{0.4}O_2$ | P2 | 94 |
| $Na_{0.7}Mn_{0.40}Ni_{0.10}Co_{0.5}O_2$ | P2 | 96 |

The structure of these samples were evaluated X-ray diffraction (XRD). XRD patterns were recorded on a diffractomer (D5000, Bruker or Enpyrean Panalytical) equipped with a Cu target. These results are given FIGS. 3(a)-(e). All the samples were identified as having a P2 structure without any other crystal phases or impurities. Cell parameter refinements were performed using LeBail method in FullProf program. A summary of cell parameter data is given in Table 2.

TABLE 2

| Composition | $A_{hex}$ (Å) | $C_{hex}$ (Å) | FIG. |
|---|---|---|---|
| $Na_{0.7}Mn_{0.7}Ni_{0.3}O_2$ | 2.8874 (1) | 11.142 (1) | 3a |
| $Na_{0.7}Mn_{0.55}Ni_{0.25}Co_{0.2}O_2$ | 2.8765 (1) | 11.053 (1) | 3b |
| $Na_{0.7}Mn_{0.5}Ni_{0.2}Co_{0.3}O_2$ | 2.8696 (1) | 11.096 (1) | 3c |
| $Na_{0.7}Mn_{0.45}Ni_{0.15}Co_{0.4}O_2$ | 2.8545 (1) | 11.056 (1) | 3d |
| $Na_{0.7}Mn_{0.40}Ni_{0.10}Co_{0.5}O_2$ | 2.8501 (1) | 10.997 (1) | 3e |

It can be seen that the $A_{hex}$ parameter decreases with increasing Co ratio. The $A_{hex}$ parameter is strongly related to transition metal radii in the ab plane. The ionic radius $Co^{3+}$ (0.52 Å) is much smaller than for $Ni^{2+}$ (0.69 Å). Therefore, it is assumed that the increase of Co ratio leads to a decrease of the $A_{hex}$ parameter. In short, this result shows that it is possible to accomplish the exchange between Co and Ni without any unwanted crystal phases or impurities.

The mixed oxides prepared and studied by X-ray diffraction were then tested as cathode active materials. For electrochemical testing, a positive electrode was prepared using a mixture containing 88 wt. % of the active material, 10 wt. % of carbon black as electronic conductor and 2 wt. % of polytetrafluoroethylene (PTFE) as binder. The electrolyte was 1 M $NaPF_6$ in propylene carbonate with 2 wt. % of fluoroethylene carbonate (FEC) as additive. Electrochemical properties were evaluated in the galvanostatic mode using VMP-3 (Bio logic). Galvanostatic performances were evaluated at a current rate of C/20 in a range between 1.5 V and 4.3 V. All the cell voltages are given vs. $Na^+/Na$ redox couple. Cycle performance was evaluated in 10 cycles. The exact cycle retention values are shown in Table 1 above. As mentioned before, the cyclability improved considerably with higher levels of Co. In particular, at Co=0.5, the cycle retention indicates 96% (improvement 18%). It is believed that the stability of P2 phase at high voltage (above 4.0 V) becomes higher. In fact, the phase transition from P2 to another similar phase would occur above 4.0 V. Such a phase transition may be correlated with low cyclability in the case of compositions having only one or two transition metal cations. Co=0.5 with Mn and Ni leads to very high cyclability.

The invention claimed is:

1. A mixed oxide of sodium and transition metals having the formula (1):

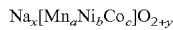

$$Na_x[Mn_aNi_bCo_c]O_{2+y} \quad (1)$$

wherein:
0.5≤x≤0.9,
−0.1≤y≤0.1,
a+b+c=1,
4a+2b+3c=4−x+2y,
0<c≤0.5,
a>0,
b>0, and
wherein the mixed oxide is a layered oxide having a P2 crystal structure.

2. The mixed oxide according to claim 1, wherein 0.60≤x≤0.80.

3. The mixed oxide according to claim 1, wherein c>0.30.

4. The mixed oxide according to claim 1, wherein 0.35≤a≤0.55.

5. The mixed oxide according to claim 1, wherein 0.05≤b≤0.25.

6. A process for producing a mixed oxide of sodium and transition metals according to claim 1, comprising the steps of:
   (a) preparing an aqueous Solution 1 containing a mixture of soluble salts of Mn, Ni and Co;
   (b) preparing an aqueous Solution 2 containing a soluble sodium source;
   (c) introducing Solutions 1 and 2 simultaneously into a receiving vessel to induce precipitation, wherein the receiving vessel is provided in advance with water;
   (d) recovering the precipitate obtained in step (c), and optionally washing it with distilled water;
   (e) drying the precipitate obtained through step (d);
   (f) combining, in an inert atmosphere, the dried material obtained through step (e) with a further source of sodium in an amount enabling the required stoichiometry for a final composition according to formula (1) of claim 1 to be reached;
   (g) calcining the mixture obtained through step (f) for a temperature of at least 700° C. and at most 1000° C. for a time of at least 1 hour and at most 24 hours.

7. The process according to claim 6, wherein the transition metal salts recited in step (a) include nitrates.

8. The process according to claim 6, wherein the sodium source recited in steps (b) or (f) includes sodium carbonate ($Na_2CO_3$).

9. A positive electrode for a sodium ion secondary battery comprising the mixed oxide of sodium and transition metals according to claim 1.

10. A sodium ion secondary battery having the positive electrode for a sodium ion secondary battery according to claim 9, a negative electrode having a negative electrode active material, and an electrolyte.

11. The mixed oxide according to claim 1, wherein 0.65≤x≤0.75.

12. The mixed oxide according to claim 1, wherein c>0.40.

13. The mixed oxide according to claim 1, wherein c≥0.45.

14. The mixed oxide according to claim 1, wherein a≤0.45.

15. The mixed oxide according to claim 1, wherein b≤0.15.

* * * * *